Patented Mar. 5, 1935

1,993,700

UNITED STATES PATENT OFFICE 1,993,700

SYNTHETIC RESIN AND PROCESS OF MAKING SAME

Lloyd C. Swallen and Kenneth M. Irey, Terre Haute, Ind., assignors to Commercial Solvents Corporation, Terre Haute, Ind., a corporation of Maryland No Drawing. Application February 24, 1931, Serial No. 518,027

5 Claims. (Cl. 260-8)

Our invention relates to certain new compositions of matter which are valuable as components of cellulose ester compositions, molding compositions, lacquers, and varnishes.

These new compositions are obtained by the esterification of polybasic acids, or their anhydrides, with both polyhydric and monohydric alcohols, giving esterified structures of high molecular weight, say 500 or higher.

Our invention contemplates the production of an esterified structure of low acidity in which, it is believed, a portion of the hydroxyl groups of the polyhydric alcohol remains free.

Our invention relates specifically to an improvement of the process and composition described in a copending application, U. S. Serial No. 515,396, filed February 12, 1931 by W. C. Arsem for "Process of producing resins", which is an improvement over United States Patent 1,938,791 by W. C. Arsem for "Composition of matter and process for making same", issued December 12, 1933. According to the disclosures therein made, a polyhydric alcohol is first reacted with a polybasic acid or its anhydride. A part, but not all, of the carboxyl groups in the product thus obtained are then esterified, in the presence of an esterification catalyst of the usual type, with a monohydric alcohol. The compound thus produced is next further condensed by heating until only a relatively few carboxyl groups remain unreacted. We have now found that the resinous product obtained by the procedure just described may be very materially improved by subjecting it to an additional treatment which serves to remove certain of the materials produced during the operation and which, if allowed to remain in the resin, give the product properties rendering it much less suitable for many more purposes than is the case with the improved product which we obtain. We have now found that by treating with a suitable solvent, for example, petroleum hydrocarbon, the product obtained as above described, certain undesirable by-products may be removed therefrom so as to give a much more desirable product.

If, instead of following the procedure set forth above, the polyhydric alcohol, monohydric alcohol and polybasic acid or its anhydride are simply mixed together and heated, the reaction takes a different course and does not give the desired product. The same is true if the acid, or its anhydride is first reacted with a monohydric alcohol and a polyhydric alcohol then added to the mixture and the reaction continued. The products obtained in such cases are generally of much higher acidity and differ markedly from the products obtained by the improved procedure herein described.

It is believed that in obtaining the final product herein disclosed and claimed the following types of compounds are produced:

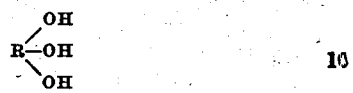

represents a polyhydric alcohol, R'OH a monohydric alcohol, and A(COOH)₂ a polybasic acid. The polybasic acid, or its anhydride, on being reacted with a suitable amount of the polyhydric alcohol, either in the presence or absence of an esterification catalyst, gives among other compounds a mixture of compounds consisting apparently mainly of

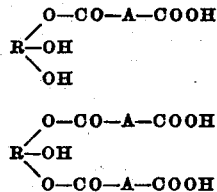

and The product of the step described above, on being esterified with a monohydric alcohol, gives apparently mainly a mixture of compounds of the type:

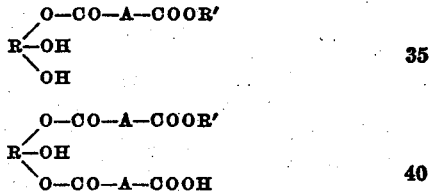

and

It should be noted also that in addition to the products described above, the product contains considerable amounts of unchanged products of the first stage and certain other products of much lower molecular weight and boiling point, for example, simple esters of the polybasic acids, are also produced, which, unless removed, reduce to an appreciable extent the desirable properties of these new materials when used as resins.

After removing the excess of monohydric alcohol used in the second stage of the process, the reaction product is heated in order to cause further esterification. During this operation, apparently the chief reaction takes place between the products of the second step mentioned above and the unchanged product of the first step in such a manner as to produce a mixture of compounds of the type:

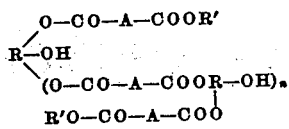

where "$n$" may be any number but is usually between 1 and 4. The proportion of reactants and the method of procedure may be varied so as to change the average value of "$n$" in the above formula and, therefore, the properties of the final product. For example, in order to increase the number "$n$", the proportion of polyhydric alcohol should be increased, in which case the proportion of monohydric alcohol is necessarily decreased somewhat.

The example given below will illustrate the preparation of our new composition.

EXAMPLE

*Reaction product of glycerol, butyl alcohol and phthalic acid (anhydride)*

One mole (92 grams) of glycerol and 1.5 moles (222 grams) of phthalic anhydride are fused at 130–135° C. Heating is then continued at 160° C. for 10 minutes. During the reaction which takes place at this point apparently one-half of the potential carboxyl groups of the phthalic anhydride are esterified with the glycerol. To this product is next added 300 grams of normal butyl alcohol mixed with 22 grams of concentrated hydrochloric acid (sp. gr. 1.2), and the resulting liquid heated as quickly as possible to about 110° C. in a vessel provided with a fractionating column. The material is then distilled at such a rate that the temperature of the liquid being heated rises from 110° C. to 135° C. in about 1 hour and 25 minutes. The unreacted butyl alcohol remaining in the product is then removed by distilling to 125° C. liquid temperature in vacuo. In this step apparently from one-half to two-thirds of the free carboxyl groups remaining after the first step of the operation are esterified with butyl alcohol.

The product obtained by the above procedure, containing free hydroxyl and carboxyl groups, is heated at a temperature of 175° to 190° C. for 10 to 30 hours, or until the acid value, as determined in acetone solution, is less than about 12. During the heating condensation occurs with the elimination of water, and the product becomes more and more viscous, while the acid value continues to fall until in the later stages of the condensation the product becomes almost solid.

According to our improved procedure, the product produced as hereinabove set forth, is next agitated with an equal or larger portion of a suitable solvent, for example, petroleum hydrocarbon having a boiling range between 95° and 160° C., at a temperature above 90° C. for from about one-half to about three hours. The petroleum hydrocarbon, or other solvent, layer is then decanted and the extraction repeated from two to three times with fresh portions of solvent. This treatment extracts almost completely the dibutyl phthalate which is formed during the process as a by-product and which renders the resin product softer than is usually desirable. When the extraction operation has been completed the petroleum hydrocarbon remaining in the resin may be removed by distilling to a liquid temperature of 120° C. in vacuo. The resulting product is a plastic solid slightly deformable at room temperature. For convenience of handling the resin may be dissolved in a solvent composed of 9 parts toluol and 1 part n-butyl alcohol. If desired, the resin may also be treated in solution with Noritol or other such agent and then filtered so as to decolorize the resin.

In the specific example described above for the purpose of illustrating our invention, we have used 1 mole of polyhydric alcohol and 1.5 moles of polybasic acid. It should be understood, however, that the relative amounts of these materials used may be varied somewhat without altering appreciably the course of the reaction. For example, the proportion of acid to polyhydric alcohol may be varied between 1¼ and 2 moles. It should be noted also that an appreciable excess of monohydric alcohol was added to the reaction mixture, a portion of which was removed unchanged. Usually the amount of this constituent entering into the reaction varies from about ¾ mole to about 1¼ moles.

The compositions obtained as described above range in consistency from very viscous liquids to slightly deformable solids at ordinary room temperature. When heated to a higher temperature they become viscous liquids. They may, with few exceptions, be described as plastic, flexible, fusible resins. They have high molecular weights ranging usually between 700 and 2000, and are practically non-volatile at temperatures below 200° C. They are immiscible with petroleum hydrocarbons, miscible with esters, ketones and aromatic hydrocarbons and alcohols when mixed in equal proportions, and are soluble in all proportions in acetone and in mixtures of alcohols and any of the above-mentioned solvents. When deposited in thin films by the evaporation of a solvent they give flexible coatings, which are improved by the presence of a certain proportion of a substance such as nitrocellulose or cellulose acetate.

These substances are compatible with the constituents of lacquers and exert on nitrocellulose and cellulose acetate compositions a plasticizing action and increase the flexibility of the film. They combine the properties of plasticizers and ordinary resins.

Quite a wide variety of materials may be substituted with satisfactory results for the different materials used in the specific example cited above. In place of phthalic anhydride, for example, such di- or polybasic acids as phthalic acid, terephthalic acid, tartaric acid, malic acid, succinic acid and citric acid may be employed. For the glycerol other di- or polyhydric alcohols such as ethylene glycol, butylene glycol, erythritol, mannitol, etc. may be satisfactorily substituted. Instead of normal butyl alcohol other aliphatic or aromatic alcohols such as, for example, ethanol, secondary butyl alcohols, benzyl alcohol, normal amyl alcohol, methyl alcohol, the ethyl ether of ethylene glycol, the mono acetate of diethylene glycol or the like may be used. Obviously, however, varying the constituents of the reaction mixture varies the character of the product formed and to some extent the operating procedure which must be followed in order to obtain the desired products.

Among others, the following combinations have given very satisfactory results: (*a*) glycerol, phthalic anhydride and the ethyl ether of ethylene glycol, (*b*) glycerol, phthalic anhydride and benzyl alcohol, (c) glycerol, succinic acid and amyl alcohol.

It is understood, of course, that we make no claim to either the composition or the procedure set forth in said United States patent application Serial No. 515,396, filed February 12, 1931 by W. C. Arsem, or the said United States Patent 1,938,791 by W. C. Arsem. We desire to claim only the improved products and process hereinabove described by us.

It is understood also that we are not limited to the use of petroleum hydrocarbons boiling between 95° and 160° C. but may also employ any other solvent which is a non-solvent for the resinous materials being treated but which is a solvent for the polybasic acid ester which it is desired to remove, and provided said solvent does not boil at a temperature sufficiently high to prevent its separation from the resin by distillation or other means. Due to the wide range of materials which may be reacted according to the present invention it is obvious that the solvent material suitable for use in any particular case will depend upon the particular materials being reacted, and hence the solubility of the final resin and of the polybasic acid ester which it is desired to separate from it.

As previously indicated, in preparing our new compositions either a polybasic acid or its corresponding anhydride may be employed. In the appended claims, therefore, it is understood that the term "polybasic acid" includes also the corresponding polybasic acid anhydride.

What we desire to claim is:

1. In a process for the production of a non-volatile plastic fusible resinous condensation product by heating one mol of polyhydric alcohol with from 1¼ to 2 mols of a dibasic carboxylic acid, effecting substantial but not complete esterification of the resulting product with a monohydric alcohol in the presence of an esterification catalyst, removing the water of reaction and the excess monohydric alcohol, and further heating to effect condensation by reaction between the remaining free carboxyl and hydroxyl groups, the improvement which comprises extracting from said final product the esters of the polybasic acid with the monohydric alcohol formed as a by-product.

2. In a process for the production of a non-volatile plastic fusible resinous condensation product by heating one mol of glycerol with from 1¼ to 2 mols of a dibasic carboxylic acid, effecting substantial but not complete esterification of the resulting product with a monohydric alcohol in the presence of an esterification catalyst, removing the water of reaction and the excess monohydric alcohol, and further heating to effect condensation by reaction between the remaining free carboxyl and hydroxyl groups, the improvement which comprises extracting from said final product the esters of the polybasic acid with the monohydric alcohol formed as a by-product.

3. In a process for the production of a non-volatile plastic fusible resinous condensation product by heating one mol of glycerol with from 1¼ to 2 mols of phthalic acid, effecting substantial but not complete esterification of the resulting product with a monohydric alcohol in the presence of an esterification catalyst, removing the water of reaction and the excess monohydric alcohol, and further heating to effect condensation by reaction between the remaining free carboxyl and hydroxyl groups, the improvement which comprises extracting from said final product the esters of phthalic acid with the monohydric alcohol.

4. In a process for the production of a non-volatile plastic fusible resinous condensation product by heating one mol of glycerol with from 1¼ to 2 mols of phthalic acid, effecting substantial but not complete esterification of the resulting product with butyl alcohol in the presence of an esterification catalyst, removing the water of reaction and the excess butyl alcohol, and further heating to effect condensation by reaction between the remaining free carboxyl and hydroxyl groups, the improvement which comprises extracting from said final product the dibutyl phthalate formed as a by-product.

5. In a process for the production of a non-volatile plastic fusible resinous condensation product by heating one mol of glycerol with from 1¼ to 2 mols of phthalic acid, effecting substantial but not complete esterification of the resulting product with butyl alcohol in the presence of an esterification catalyst, removing the water of reaction and the excess butyl alcohol, and further heating to effect condensation by reaction between the remaining free carboxyl and hydroxyl groups, the improvement which comprises extracting from said final product, by means of a liquid petroleum hydrocarbon boiling between 95° and 160° C., the dibutyl phthalate formed as a by-product.

LLOYD C. SWALLEN.
KENNETH M. IREY.